US008949622B2

(12) United States Patent
Dowd

(10) Patent No.: US 8,949,622 B2
(45) Date of Patent: Feb. 3, 2015

(54) SECURE REMOVABLE DRIVE SYSTEM

(71) Applicant: Imation Corp., Oakdale, MN (US)

(72) Inventor: Alan Dowd, White Bear Lake, MN (US)

(73) Assignee: Imation Corp., Oakdale, MN (US)

(*) Notice: Subject to any disclaimer, the term of this patent is extended or adjusted under 35 U.S.C. 154(b) by 120 days.

(21) Appl. No.: 13/737,503

(22) Filed: Jan. 9, 2013

(65) Prior Publication Data
US 2013/0179696 A1 Jul. 11, 2013

Related U.S. Application Data

(60) Provisional application No. 61/584,615, filed on Jan. 9, 2012.

(51) Int. Cl.
G06F 12/14 (2006.01)
G06F 21/78 (2013.01)
G06F 21/80 (2013.01)
G06F 21/85 (2013.01)

(52) U.S. Cl.
CPC ............ *G06F 12/1408* (2013.01); *G06F 21/78* (2013.01); *G06F 21/80* (2013.01); *G06F 21/85* (2013.01); G06F 2221/2105 (2013.01); G06F 2221/2107 (2013.01)
USPC ............ 713/189; 713/188; 713/193; 726/10; 726/20; 726/22; 726/24

(58) Field of Classification Search
CPC ...... G06F 12/14; G06F 11/30; G06F 12/1408
USPC ........... 713/189, 193, 188; 726/10, 20, 22, 24
See application file for complete search history.

(56) References Cited

U.S. PATENT DOCUMENTS

2006/0101197 A1* 5/2006 Georgis et al. ................ 711/111
2012/0017097 A1* 1/2012 Walrath ........................ 713/190

* cited by examiner

Primary Examiner — Mohammad A Siddiqi
(74) Attorney, Agent, or Firm — Dorsey & Whitney LLP

(57) ABSTRACT

A data storage system comprises a removable drive with memory for storing data, and an identifier for identifying the removable data cartridge. A host computer can be coupled in data communication with the removable data cartridge, with a driver for performing data operations thereon. The driver is configured to perform the data operations with encryption, in the presence of the identifier, and to perform the data operations without the encryption, in the absence of the identifier.

20 Claims, 2 Drawing Sheets

SECURE REMOVABLE DRIVE SYSTEM

CROSS-REFERENCE TO RELATED APPLICATIONS

This application claims priority to U.S. Provisional Application No. 61/584,615, filed Jan. 9, 2012, entitled SECURE REMOVABLE HARD-DRIVE SYSTEM, the entire contents of which are hereby incorporated by reference.

FIELD

The present disclosure relates generally to removable media, and in particular to secure removable drives and data cartridges. More specifically, the disclosure relates to data encryption on secure removable hard drive and data cartridge systems.

BACKGROUND

Advancements in data technology have enabled increased mobility. Devices such as laptop computers, tablets, flash drives, removable hard drives, cellular phones, smart phones, etc. are all easily portable and highly mobile. Features of such mobile devices that typically facilitate mobility can include small foam-factors, decreased power consumption, increased durability, and the like. The features that facilitate increased mobility, however, have also increased the likelihood of losing and/or misplacing such mobile devices.

In view of an increased likelihood of losing a mobile device (and any data that may be stored on such a mobile device), there has been an increasing emphasis on security. Accordingly, many mobile and portable devices such as laptop computers, flash drives, and the like have security measures to prevent unauthorized access to data stored in memory on the devices.

However, one category of portable devices that may not include sufficient security measures includes removable hard drives, such as, e.g., RDX formatted removable disk and removable drive cartridges, and removable solid state hard drives. Despite the portability and mobility of these devices, many lack security measures such as encryption and remote management, which can secure data stored in memory on the devices in the event of attempted unauthorized access.

Accordingly, there may be a need to address at least some of the above-described deficiencies. In particular, there may be a need for systems and methods that provide secure data storage, without exhibiting all the limitations of the prior art.

SUMMARY

This disclosure encompasses systems and method for secure data storage on removable drives and data cartridges. In particular examples and embodiments, a data storage system includes a removable data cartridge with a media identifier, and memory for storing data. A host computer can be coupled in data communication with the removable data cartridge, with a driver for performing data operations. For example, the driver can be configured to perform the data operations with encryption on the removable data cartridge, in the presence of the identifier, and to perform the data operations without encryption on other removable data cartridges, in the absence of the identifier.

In additional examples and embodiments, the encryption may be provided based on the identifier, absent corresponding instructions from a user of the host computer. The encryption may not be bypassable by the user, in the presence of the identifier, absent administrative privileges.

The memory itself may comprise a non-volatile computer readable data storage medium. The non-volatile medium may store program data executable by the host computer to configure the driver, so that the driver performs the data operations to provide the encryption, in the presence of the identifier. The driver can also be configured to require user authentication for performing the data operations, in the presence of the identifier, and to perform the data operations without the user authentication, in the absence of the identifier.

The memory may comprise a data storage medium having RDX formatting, and the identifier may include a product identification or vendor identification for identifying the storage medium as such. The identifier may also associate a selected provider with the data cartridge.

The driver can thus be configured to perform data operations with encryption on data cartridges associated with the selected provider, and without encryption on data cartridges not associated with the selected provider. The encryption can be performed seamlessly, so that user operation of the host computer is substantially unchanged for data operations without encryption, absent the identifier.

In additional examples and embodiments, a removable data cartridge may be coupled to a workstation, and a media identifier may be read from the cartridge. The cartridge may include non-volatile memory for storing data, the media identifier may identify the memory as having an RDX format, and data operations can be performed on the memory, based on the media identifier. For example, data stored in the memory may be encrypted, in the presence of the identifier, and the data may not be encrypted, in the absence of the identifier. Similarly, user authentication may be required to perform the data operations, in the presence of the identifier, and the data operations may be performed without user authentication, in the absence of the identifier.

In additional applications, the encryption is "always on," or not bypassable (e.g., by a user of the workstation). Thus, data stored in the memory of the removable data cartridge may always be encrypted, in the presence of the media identifier.

Program data can also be read from the memory of the removable data cartridge, and executed by the workstation to encrypt the data in the presence of the media identifier. Execution of such program data may be seamless, so that user operation of the workstation is substantially unchanged in performing the data operations. The media identifier may also associate the memory with a selected provider, so that the data are encrypted in memory associated with the selected provider, and the data are not encrypted in memory unassociated with the selected provider.

Exemplary embodiments of the present disclosure can also provide a secure removable drive system. For example, the exemplary system can include a secure removable drive and a non-transitory computer readable medium including program instructions stored thereon. The program instructions can be executed by a processor to provide "always-on" encryption of the secure removable hard drive, based on a media identifier.

According to an exemplary embodiment of the present disclosure, the removable drive can include an RDX formatted cartridge type memory. Further, the program data stored on the non-transitory computer readable medium can be configured for execution on the processor to automatically recognize the media identifier, based on a vendor or product identification, and to provide either networked or stand-alone operation, for example in the absence of any instructions received over a network.

These and other objects, features, and advantages of the present disclosure will become apparent upon reading the following detailed description of exemplary embodiments of the present disclosure, when taken in conjunction with the appended drawings and claims.

BRIEF DESCRIPTION OF THE DRAWINGS

Further objects, features, and advantages of the present disclosure will become apparent from the following detailed description, taken in conjunction with the accompanying drawings showing illustrative embodiments of the present disclosure, in which.

Figure 1:
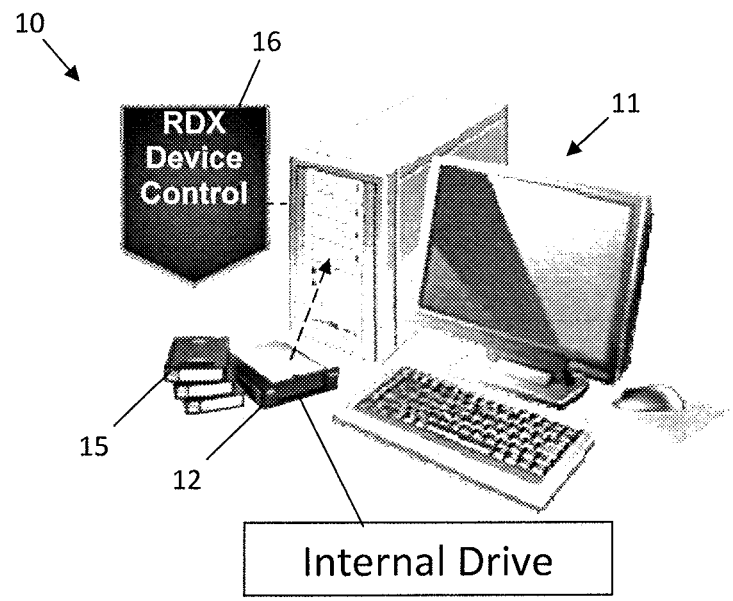
FIG. 1 is an illustration of a secure data system in accordance with certain exemplary embodiments of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments, and is not limited by the particular embodiments illustrated in the figures.

DETAILED DESCRIPTION

The ensuing description provides exemplary embodiment(s) only, and is not intended to limit the scope, applicability, or configuration of the disclosure. Rather, the ensuing description of the exemplary embodiment(s) will provide those skilled in the art with an enabling description, for implementing exemplary embodiments of the disclosure. It should be understood that various changes may be made in the function and arrangement of the elements described herein, without departing from the spirit and scope of the present disclosure.

Exemplary embodiments of the present disclosure can provide a secure removable drive system. The removable drive can include any removable solid state or rotating disk (e.g., hard) drive, and can have any interface known in the art, such as, for example, a universal serial bus (USB) 3.0 interface, an IEEE 1394 connection, or a Serial Advanced Technology Attachment (SATA) interface. According to a one embodiment of the present disclosure, the secure removable hard drive can include a secure removable RDX cartridge.

The exemplary secure removable cartridge system can be implemented on a stand-alone workstation running any operating system (e.g., Windows, GNU/Linux, Mac OS, etc.), and can include, for example, a locally attached external or internal drive bay, or an removable drive or data cartridge appliance.

In one embodiment, an exemplary secure removable RDX cartridge system does not require a network connection. Alternatively, the exemplary secure removable RDX cartridge system can utilize a network connection to provide additional functionality (e.g., device management, password recovery, event logging, etc.), such as described below. Accordingly, the exemplary secure removable RDX cartridge system can include a stand-alone mode and a managed mode for stand-alone and networked applications, respectively.

Figure 2:
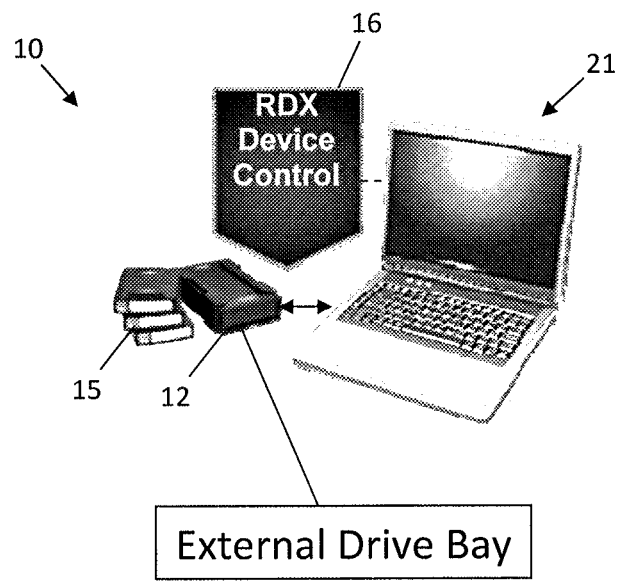
FIG. 2 is an illustration of another secure data system in accordance with certain exemplary embodiments of the present disclosure.
Figure 3:
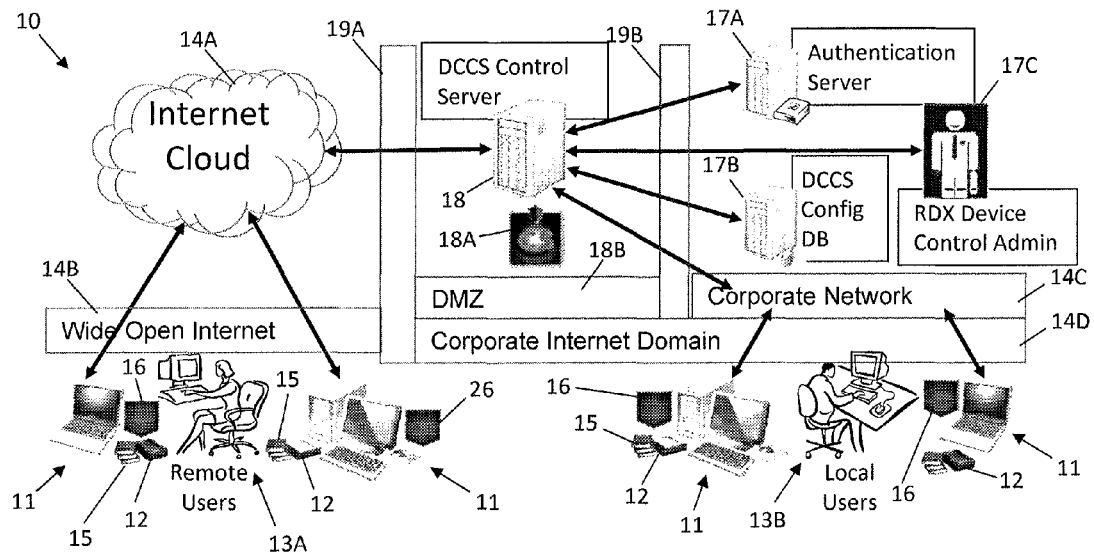
FIG. 3 is an illustration of a corporate network with a secure data system in accordance with certain exemplary embodiments of the present disclosure.

FIGS. 1 and 2 show exemplary standalone secure removable RDX cartridge systems 10, and FIG. 3 shows an exemplary networked secure removable RDX cartridge system 10. For example, FIG. 1 shows a workstation 11 with an internal RDX drive bay 12, and FIG. 2 shows a workstation 11 with an external RDX drive bay 12. FIG. 3 shows a corporate networked implementation that can include remote users 13A connected to workstations 11 having RDX drive bays 12 (e.g., such as those shown in FIGS. 1 and 2) via network connections (e.g., the Internet or cloud 14A, 14B, corporate intranet or networks 14C, 14D, etc.).

As shown in FIG. 3, networked secure removable RDX cartridge system 10 includes workstations 11 with internal and external drive bays 12 for users 13A and 13B. Remote users 13A may connect to system 10 via internet/cloud 14A, for example via wide-open internet 14B. Local users 13B may connect to system 10 via corporate network 14C, for example via or across corporate internet domain 14D.

DCCS control server (or digital/distributed command and control server) 18 with control system 18A and DMZ ("demilitarized zone") or perimeter network 18B are located between external and internal firewalls 19A and 19B, respectively. DCCS control server 18 is connected to internet/cloud 14A, for example through external firewall 19A. DCCS control server 18 is also connected to authentication server 17A, DCCS configuration database 17B, RDX device control administrator 17C, and corporate network 14C, for example through internal firewall 19B.

According to certain exemplary embodiments of the present disclosure, the exemplary secure RDX cartridge systems 10 includes various security features to protect data stored on the secure RDX cartridges 15 from unauthorized access. In one exemplary embodiment, the exemplary systems 10 can provide Advanced Encryption Standard (e.g., AES-256) level encryption and validation in compliance with the Federal Information Processing Standard (FIPS) Publication 110-2 (e.g., levels 1-4). Alternatively, certain exemplary embodiments of the present disclosure can provide other levels of encryption, such as, e.g., AES-128, AES-192, etc.

Such security features can be implemented through software, firmware, and/or hardware. In an exemplary embodiment of the present disclosure, the security features can be provided via a software module embedded onto an RDX cartridge 15, which can be installed onto or coupled with a workstation 11. Alternatively, the software can be obtained via a network connection (e.g., the Internet or cloud 14A, etc.) or provided on a transportable medium (e.g., optical disk, flash drive, etc.) to be installed onto a workstation 11. According to certain exemplary embodiments of the present disclosure, existing security features designed for other portable devices (e.g., flash drives, etc.) can be repurposed for removable hard drives such as removable RDX cartridges 15.

In one embodiment, exemplary secure RDX cartridge systems 10 can include a control driver 16 installed onto a workstation 11 to which the RDX cartridge 15 is attached. Alternatively, a DCCS control server 18 may be provided in signal communication with the workstation 11 over a network, for example one or more of networks 14A-14D with various firewalls 19A and 19B.

Figure 4:
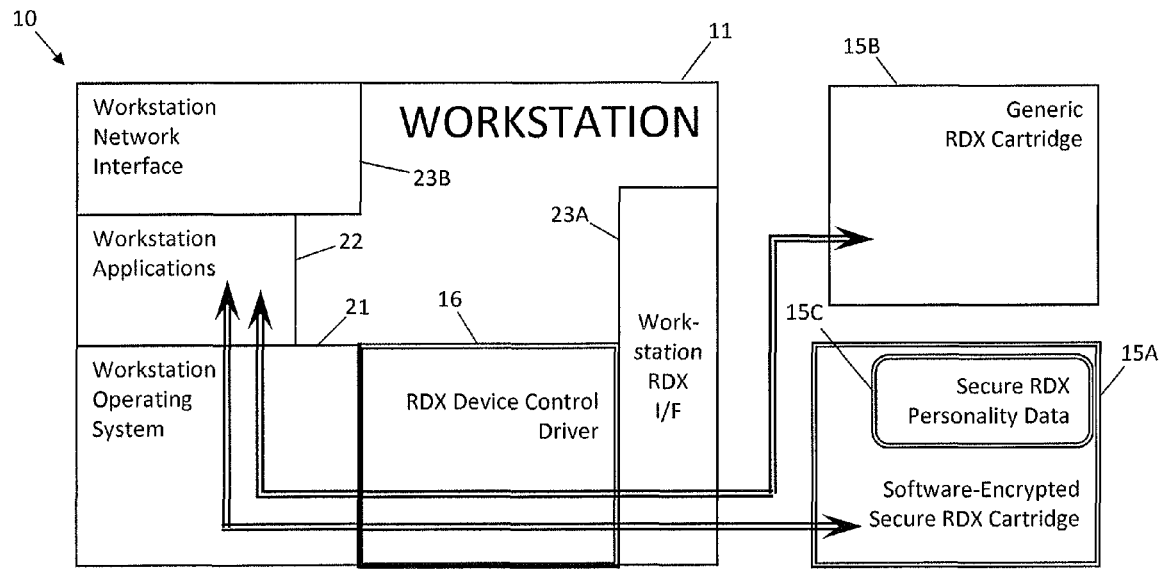
FIG. 4 is a block diagram of another secure data system in accordance with certain exemplary embodiments of the present disclosure.

FIG. 4 shows a block diagram of an exemplary secure RDX cartridge system 10 with an RDX device control driver 16. The RDX control driver 16 can facilitate and provide the encryption and security features for the exemplary secure RDX cartridge system 10. Additionally, the exemplary secure RDX system 10 can embed deep hooks into the operating system 21 of the workstation 11 on which the RDX device control driver 16 is installed, and provide always-on encryption that is not readily bypassable. Further, the device control driver 16 can facilitate user provisioning of the encryption features of the exemplary secure RDX cartridge-based data storage system 10.

Additionally, the exemplary secure RDX systems 10 can integrate seamlessly into the (host) operating system 21 (e.g., for backup and ad hoc storage), and can provide a hidden protected directory on the RDX cartridge 15A. For example, besides a password prompt, a user 13A, 13B in one embodiment will not be able to distinguish operation of the exemplary secure RDX system 10 when compared to a non-secure RDX system.

In one exemplary embodiment, the exemplary secure RDX system 10 can also automatically recognize vendor identifications (VIDs) and product identifications (PIDs) to identify secure RDX data cartridges 15A, and differentiate between secure 15A and non-secure RDX cartridges 15B. The automatic recognition of VIDs and PIDs (and other identifiers) may be hard-coded, so that the recognition can be performed even if a secure RDX cartridge 15A is erased (e.g., formatted, etc.).

FIG. 4 shows a block diagram of the exemplary secure RDX cartridge system 10, with an exemplary RDX Device Control Driver 16 installed onto a workstation 11. As shown in FIG. 4, the RDX Device Control Driver 16 can be installed such that it controls transmission of data from any attached RDX cartridge 15A, 15B. For example, encrypted data can be transmitted to and from the software-encrypted secure RDX cartridge 15A via the exemplary RDX Device Control Driver 16.

Additionally, as described above, the exemplary secure RDX cartridge system 10 (including, e.g., the RDX Control Driver 16) can differentiate between a secure RDX cartridge 15A and a non-secure generic RDX cartridge 15B. Accordingly, encrypted information can be transmitted to and from the secure RDX cartridge 15A while not affecting the transmission of non-encrypted information to and from the other (non-secure or generic) RDX cartridge 15B. Thus, FIG. 4 also shows the seamless integration and operation of the RDX control driver 16 with both a secure RDX cartridge 15A and a non-secure generic RDX cartridge 15B.

As shown in FIG. 4, workstation 11 includes RDX device control driver 16, workstation operating system (OS) 21, workstation applications 22, workstation RDX interface 23A and workstation network interface 23B. Note that (e.g., always) encrypted information space (including RDX Device Control Driver 16 and Software-encrypted secure RDX cartridge 15A) is identified in double black outline; unencrypted (or sometimes unencrypted) information space is identified in single black outline.

As noted above, the exemplary secure removable RDX cartridge systems 10 can be implemented in a networked environment to provide additional functionality. For example, FIG. 3 shows an exemplary network implemented secure removable RDX cartridge system 10. In the exemplary networked implementation, the exemplary secure removable RDX cartridge system 10 can provide certain device management features. For example, the exemplary secure removable RDX cartridge system can provide features such as remote revocation, "phone home," password management (including password recovery), cryptographic erasure (e.g., deletion or obliteration of keys), full shred (with optional media clearing according to National Institutes of Standards and Technology (NIST) standards), recycling (e.g., administrative re-use), and the like.

Thus, this disclosure is directed to new or modified control client software providing seamless, always-on encryption systems 10 for selected (e.g., secure and/or branded) removable data cartridges and removable drives 15 and 15A, including, but not limited to, removable RDX cartridges, removable disk drives, removable solid state drives, and removable tape drives. Systems 10 are provided on standalone and networked workstations 11, for example in a small office or home office (SOHO) environment, a small or medium business (SMB) environment, or a corporate network environment.

This distinguishes from current systems and methods, in which there is no seamless, always-on encryption standard for RDX cartridges and other removable data systems, suitable for both standalone and networked workstations in different consumer and business environments, without the limitations of the prior art, and with all the additional features described herein. As a result, data at rest (DAR) on such removable drives and cartridge systems may vulnerable to undesired exposure, and/or undetected reading, writing, or modification. Adaptations of new and existing server and software systems are thus described, suitable for use as a driver or DCCS control server for RDX cartridges and other removable media, in the form of software, firmware, or a combination thereof, and providing the desired functionality for either new or existing driver and removable media hardware.

In some embodiments, the invention can produce a secured RDX or other removable data cartridge system 10 that is software or firmware based, with simple and easy installation and operation, and which may be combined with extant drivers, DCCS control suites, and data architectures. The deliverables include software modules provided on the removable drives themselves, providing complete system requirements, with coherent and comprehensive content for producing the desired level of encryption, authentication, and other data system functionality, as described herein.

The software product(s) may be run with DCCS suites and architectures, operable on WINDOWS XP, VISTA, GNU, LINUX, MAC OS and other operating systems, with 32-bit and 64-bit compatibility. Internal (SATA and USB) and external (e.g., USB) drive bays are supported, without necessarily requiring modifications to existing backup (and other) software products. End user installation is supported, which works well with device control (DC) applications, and control server (CS) systems can be utilized, but are not required.

In secured RDX and other removable-drive systems 10, DCCS products can be coerced or utilized to provide encryption services for RDX and other data cartridge systems. In particular, the software products successfully operate with WINDOWS XP, WINDOWS 7 and other operating systems, utilizing DCCS control servers and control clients, in external and internal USB and SATA drive bay implementations.

Depending upon application, systems 10 are configurable to provide software encryption for removable storage systems, including system backup and ad hoc file storage. Locally attached external (e.g., USB 3.0) RDX and internal (e.g., SATA II or USB 3.0) RDX drive bays and (e.g., A8 RDX) appliances are supported. After installation, operation may be substantially transparent, except for password authentication. "Always-on" encryption may also be provided, without user intervention or explicit user instruction, in implementations that are not readily bypassable.

For example, systems 10 with or without RDX interface 23A may provide encryption based on the VID, PID, or other media identifier provided on selected data cartridges 15 and 15A, without any corresponding instructions from the user of workstation 11. Absent the selected media identifier, data storage and retrieval on "unbranded" or unsecure data cartridges 15B may be performed in an unencrypted fashion. The system can also be configured so that the encryption is always on, and cannot be bypassed based on instructions from the user, or absent such instructions made with administrative privileges.

Systems 10 can further be configured to automatically read or identify VIDs, PIDs, and other media identifiers for selected data cartridges 15 and 15A (e.g., branded or secure RDX cartridges or removable drives), and to differentiate from other data cartridges 15B (e.g., non-secure or unbranded RDX cartridges or removable drives) that do not have the selected media identifiers. Thus, upon execution of the corresponding software code, one or both of DCCS control server (driver) 18 and workstation driver 16 may be modified or upgraded, so that formerly unencrypted data operations on unsecure data cartridges 15B are performed as encrypted data operations secure data cartridges 15A.

Further, such encryption may be provided without user prompting, selection, or input. In some applications, all data operations on secure RDX cartridges 15A may be performed as encrypted operations, including read, write, erase, overwrite, and digital shredding operations, based on the VID, PID, or other identifier, as compared to unsecure data cartridges 15B, absent the identifier, where at least some data operations are not encrypted, or otherwise unsecure.

In some applications, AES-128 or AES-256 encryption may be utilized, for example on a stand-alone WINDOWS, GNU/LINUX or MAC OS workstation, or on a similar networked workstation, running any operating system or OS. Fixed policy implementations are also provided, where systems 10 are operable to affect only RDX operation, for example based on the VID, PID, or other identifier of the corresponding data cartridge 15 or 15A, manageable by the control server to allow for system expansion and migration.

In one embodiment, software products for implementing systems 10 may provide encryption for removable storage system backup and ad hoc file storage, using a locally attached RDX drive bay, as described above. After installation, operation should be substantially transparent, except for password authentication, and should not affect the appearance of the WINDOWS or other operating system, without requiring a separate window for drag and drop, providing a substantially seamless interface for back-up programs, and leaving only a hidden, protected directory (e.g., 15C) on the RDX cartridge (e.g., 15A).

Always-on encryption techniques can be implemented in modes that are not readily bypassable, for example utilizing AES-256 and other encryption methods to embed hooks deep within the (e.g., host) operating system. A startup folder may be provided (only) for the monitor, so that if the task bar application is deleted from the startup folder, the system tools will still operate.

Systems 10 may also be implemented on stand-alone workstations 11, for example as shown in FIGS. 1, 2, and FIG. 4. Thus, network connectivity is not necessarily required, nor is a DCCS or other control server 18, as shown in FIG. 3. In standalone applications, device management, password recovery, and event logging functions may remain dormant, until the mobile device or other workstation 11 is tethered, for example using a wireless (e.g., BLUETOOTH) or wired (e.g., USB) connection to a mobile device or other workstation 11, or via the internet or other network.

Fixed policy applications are also provided, affecting only the RDX (or other removable drive) system. Secured (e.g., RDX) cartridges 15 and 15A can be automatically recognized, without changing the behavior of non-secure cartridges 15B and non-RDX removable storage systems, internal or external. In addition, secure cartridges 15 and 15A may also be recognized by or associated with particular manufacturers or providers (e.g., Imation), in order to provide secure device functionality according to one or more of systems 10, above, without changing the operation of secured or unsecured RDX cartridges 15B (and other data cartridges) provided by other manufacturers.

Control server management is also contemplated, in order to provide for expansion and migration of cartridge systems 12. On possible approach would be to modify a DCCS or other control server 18 to recognize a special-purpose control client, and then modify the control client to have a pre-configured RDX (or other removable drive) policy, as provided to removable data cartridges and drives 15A with selected media identifiers, while data operations on other (non-selected) data cartridges 15B are not affected.

Starting with an extant control client, a range of different modifications could be contemplated, in order to provide desired functionality. For example, an encryption-type tool could be utilized to perform a rebranding (or repurposing) of a current control client, to provide RDX (or other secure data cartridge) control. The required installation tools could be provided on secure RDX cartridges 15A, in order to permit user provisioning, or they may be provided over a network, or on another storage medium.

Control client installation functionality may be retained, including, e.g., deep hooks into the host operating system, while automatically recognizing product and vendor (PID and VID) identifications, for a wide range of (or substantially all) brands and types of (e.g., RDX) data cartridges, with hard-coded data policies. In particular, systems 10 may intercept function calls, messages, and events passed between software components of the host operating system (e.g., operating system 21 of workstation 11, as shown in FIG. 4), in order to provide always-on encryption for data operations on secure removable RDX drives 15 and 15A, and other desired functionality, as described herein.

Unique VID and PID identifications can also be incorporated for a set of "branded" secure RDX cartridges 15A, as distinct from those for non-secure cartridges 15B. For example, systems 10 can be configured to identify secure RDX drives 15A, as provided by or associated with a particular selected manufacturer (e.g., Imation, or another manufacturer or supplier). In addition, systems 10 can be configured to perform always-on encryption and other secure system functions for such selected drives 15A, as described herein, and not for other non-secure cartridges or drives 15B. Thus particular functions of systems 10 may not be provided for non-branded drives and cartridges 15B, which are not provided by or associated with the selected manufacturer or supplier, and which are operated in unmodified form, as observed by a user 13A or 13B or a workstation or (e.g., mobile or host) computing device 11.

When conditioning an RDX cartridge 15A for first use, a hidden, protected SecureFS folder or secure RDX personality data 15C may be utilized, as shown in FIG. 4, for example with control client implementations. Where RDX personality data 15C is hidden, moreover, these data may be unavailable to other systems, and unavailable to users 13A and 13B, absent operation of system 10.

Non-RDX removable storage media (internal and external) may be ignored, or the operation and behavior of such media may be unchanged, in peaceful coexistence with DCCS device control applications. Thus, selected secure and/or branded (e.g., RDX) data cartridges 15A may operate according to the functions of systems 10, while non-selected (e.g., unbranded, or unsecure) RDX and/or non-RDX cartridges 15B operate as before, without substantial modification, and without always-on encryption and other added system functionalities for selected data cartridges 15A, as described herein.

Additional system functionality is also contemplated, including, but not limited to, password management (including, e.g., password recovery), cryptographic erasure (e.g., to obliterate on-device cryptographic material), full data shredding (e.g., as appropriate for disk media), recycling (similar to formatting, or reformatting, but triggered through an RDX device control interface, e.g., workstation RDX interface 23A of FIG. 4).

In one set of applications, a "tailored" DCCS control client may be developed as an RDX driver, working independently of the DCCS control server 18, as shown in FIG. 3. Systems 10 may also be installable from an RDX cartridge 15A, or other secure data cartridge, into either a network-based or standalone workstation 11, with either internal or external drive(s) 12.

The foregoing merely illustrates the principles of the disclosure. Various modifications and alterations to the described embodiments will be apparent to those skilled in the art, in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure.

In addition, all publications and references referred to above are incorporated herein by reference in their entireties. It should be understood that the exemplary procedures described herein can be stored on any computer accessible medium, including a hard drive, RAM, ROM, removable disks, CD-ROM, memory sticks, tape media, etc., and executed by a processing arrangement and/or computing arrangement which can be and/or include a hardware processor, microprocessor, minicomputer, macro, mainframe, etc., including pluralities and combinations thereof.

The invention claimed is:

1. A data storage system comprising:
a secure removable data cartridge comprising memory for storing data and having a media identifier for identifying the secure removable data cartridge;
a host computer in data communication with the secure removable data cartridge; and
a driver provided within the host computer and configured to differentiate between the secure removable data cartridge and other non-secure removable data cartridges for performing data operations on the removable data cartridge, wherein:
the driver is configured to perform the data operations with encryption on the secure removable data cartridge when the media identifier is present thereon; and
the driver is configured to perform the data operations without the encryption on the other non-secure removable data cartridges when the identifier is absent therefrom, wherein the other non-secure removable data cartridges do not have the media identifier.

2. The system of claim 1, wherein the encryption is provided by the driver based on the media identifier being present on the secure removable data cartridge, absent corresponding instructions from a user of the host computer.

3. The system of claim 2, wherein the encryption is not bypassable by the user when the media identifier is present on the secure removable data cartridge, absent administrative privileges.

4. The system of claim 3, wherein the memory comprises a non-transitory computer readable data storage medium having program data stored thereon, the program data executable by the host computer to configure the driver to perform the data operations to provide the encryption, when the media identifier is present on the secure removable data cartridge.

5. The system of claim 1, wherein the driver is further configured to require user authentication for performing the data operations with the encryption when the identifier is present on the secure removable data cartridge, and to perform the data operations without the user authentication on the other non-secure data cartridges when the identifier is absent therefrom.

6. The system of claim 1, wherein the memory comprises a data storage medium having RDX formatting.

7. The system of claim 6, wherein the media identifier comprises at least one of a product identification and a vendor identification for identifying the data storage medium as having the RDX formatting.

8. The system of claim 6, wherein the media identifier associates a selected provider with the secure removable data cartridge.

9. The system of claim 8, wherein the driver is configured to perform the data operations with the encryption based on the secure removable data cartridge being associated with the selected provider when the identifier is present, and to perform the data operations without encryption on the other non-secure removable data cartridges not associated with the selected provider when the identifier is absent.

10. The system of claim 9, wherein the encryption is performed seamlessly, such that user operation of the host computer is substantially unchanged for performing the data operations to store the data without encryption on the other data non-secure removable data cartridges when the identifier is absent.

11. A data storage method comprising:
coupling a removable data cartridge to a workstation, the removable data cartridge comprising non-volatile memory for storing data;
reading a media identifier of the removable data cartridge by the workstation, wherein the media identifier identifies the memory as having an RDX format;
differentiating between the removable data cartridge having the media identifier and a non-secure removable data cartridge that does not have the media identifier; and
performing data operations based on the media identifier, wherein:
data stored in the memory of the removable data cartridge having the media identifier are encrypted when the identifier is present thereon; and
data stored in the memory of the non-secure removable data cartridge are not encrypted when the identifier is absent therefrom.

12. The method of claim 11, further comprising:
requiring user authentication to perform the data operations when the media identifier is present; and
performing the data operations without requiring the user authentication when the media identifier is absent.

13. The method of claim 11, wherein encryption is not bypassable when the media identifier is present, such that the data stored in the memory of the removable data cartridge are always encrypted in presence of the media identifier thereon.

14. The method of claim 11, further comprising reading program data from the memory of the removable data cartridge and executing the program data by the workstation to encrypt the data stored in the memory of the removable data cartridge when the media identifier is present thereon.

15. The method of claim 14, wherein execution of the program data is seamless, such that user operation of the workstation is substantially unchanged in performing the data operations on the non-secure removable data cartridge when the media identifier is absent therefrom.

16. The method of claim 11, wherein the media identifier associates the memory with a selected provider, such that the data are encrypted in memory associated with the selected provider and the data are not encrypted in memory unassociated with the selected provider.

17. A secure removable drive system, comprising:
- a secure removable drive having memory and a media identifier thereon;
- a non-transitory computer readable storage medium having program instructions thereon, which, when executed by a processor system in data communication with the secure removable drive, are configured for the processor system to:
  - differentiate between the secure removable drive having the media identifier and other non-secure removable drives not having the media identifier;
  - provide always-on encryption of the secure removable drive, wherein data stored in the memory of the secure removable drive are encrypted based on presence of the media identifier thereon; and
  - provide seamless operation of the other non-secure removable drives, wherein data stored in memory of the other non-secure removable drives are not encrypted absent the media identifier therefrom.

18. The system of claim 17, wherein the secure removable drive comprises an RDX cartridge.

19. The system of claim 17, wherein the program instructions stored on the non-transitory computer readable medium are further executable by the processor system to automatically recognize the media identifier comprising at least one of a vendor identification and a product identification associated with the secure removable drive.

20. The system of claim 17, wherein the program instructions stored on the non-transitory computer readable medium are further executable by the processor system to provide stand-alone operation of the processor system to provide the always-on encryption of the secure removable drive, in the absence of instructions received over a network connection.

* * * * *